United States Patent Office 3,462,255
Patented Aug. 19, 1969

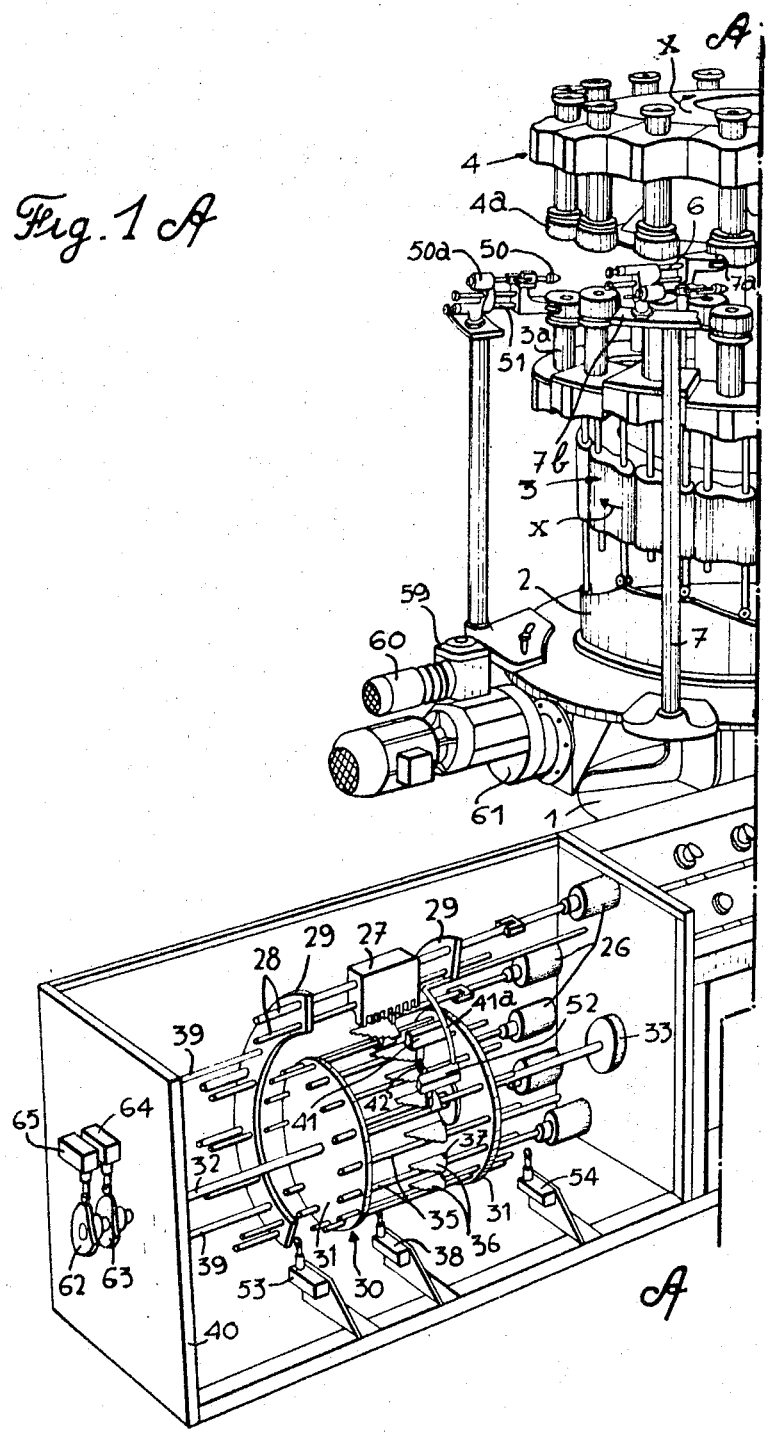

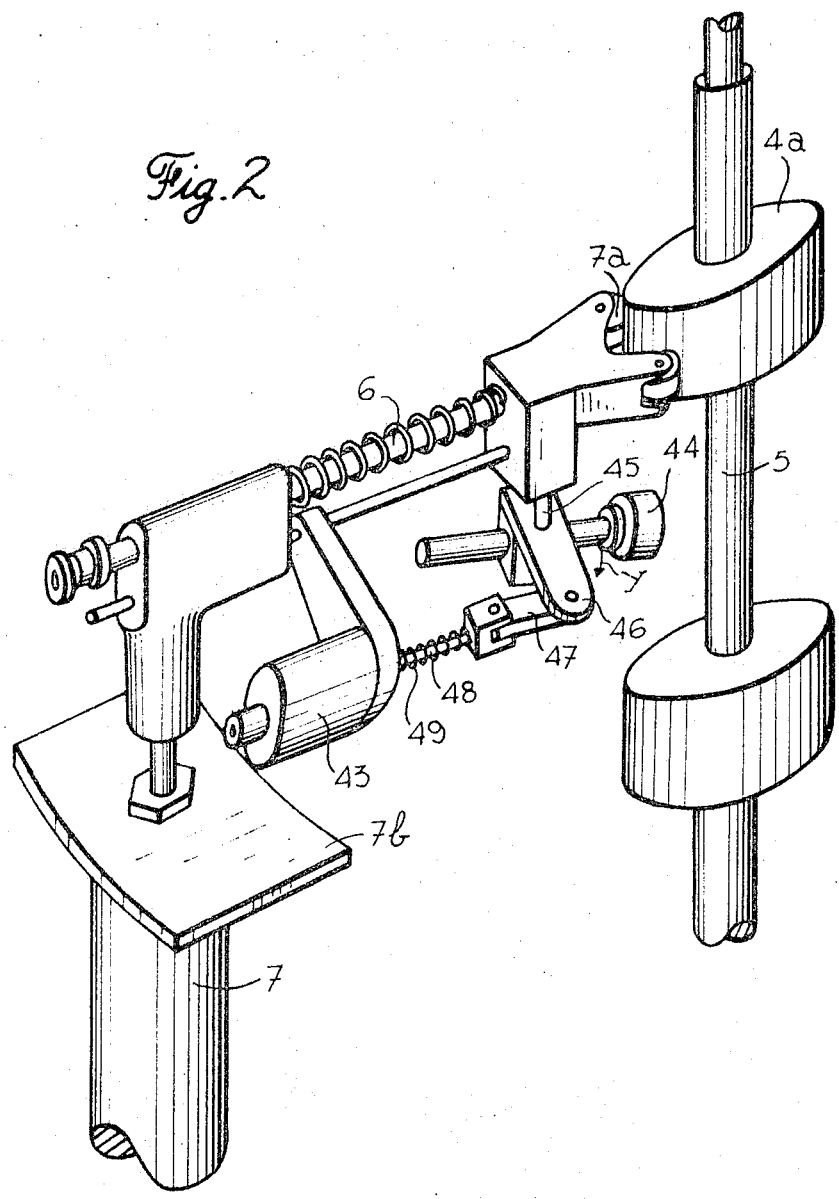

3,462,255
APPARATUS FOR CONTROLLED HEAT SOFTENING OF GLASS TUBING
Dieudonné-Marie Couquelet, Esneux, Belgium, assignor to Société d'Etudes et de Participations Couquelet, en abrégé "SEPAC," Société Anonyme, a corporation
Filed Nov. 25, 1966, Ser. No. 596,997
Claims priority, application Belgium, Dec. 24, 1965, 40,758, Patent 674,316
Int. Cl. C03b 23/12
U.S. Cl. 65—158                    18 Claims

ABSTRACT OF THE DISCLOSURE

A machine for measuring the relative diameter of the points of ampules formed from several glass tubes arranged in series about a vertical axis and adjusting the relative time of the next heating of the same glass tube according to the measured thickness of the preceding point of the ampule formed from the same tube.

Figure 1B:
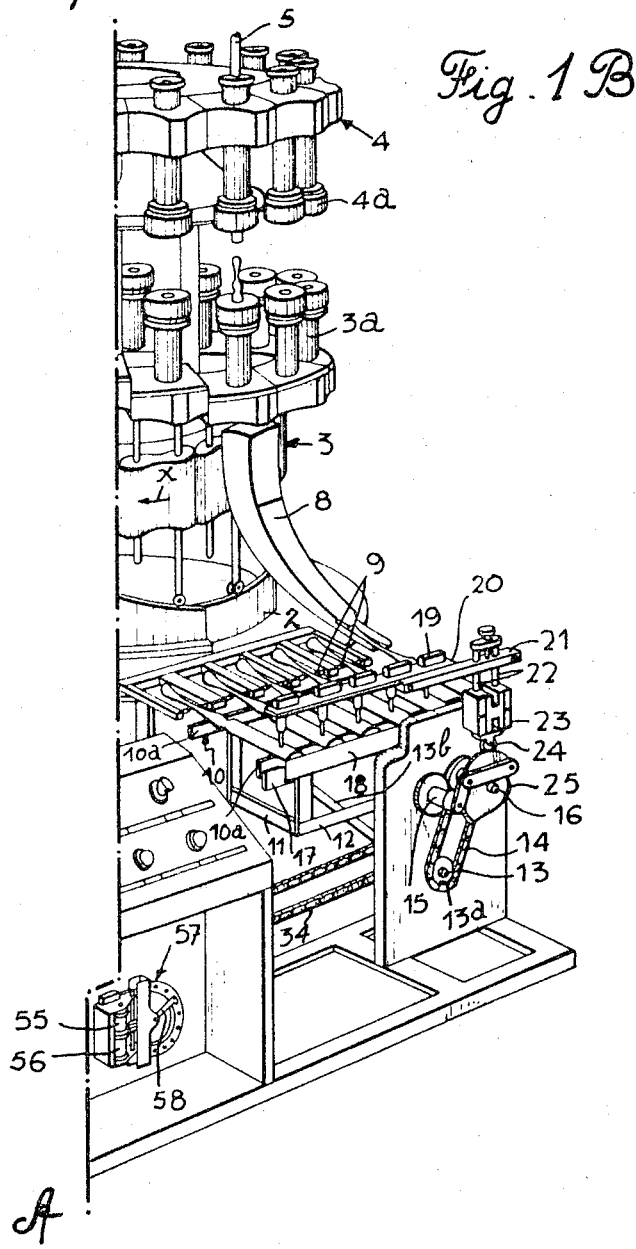

This invention relates to a rotary machine for the production of hollow glass bodies and particularly ampoules for medicaments from glass tubes.

Background of the invention

For the manufacture of pharmaceutical ampoules rotary machines are known comprising a fixed pedestal carrying a rotary drum with a vertical axis, on which are mounted gripper heads each consisting of an upper gripper and a lower gripper, likewise rotating, in which are placed the glass tubes which, as the drum rotates, pass in succession in front of heating blowpipes mounted on pivoting support arms distributed over the periphery at fixed stations and which are intermittently driven by the respective grippers; the upper grippers are arranged in a fixed plane while the lower grippers can be moved vertically in such a way as to produce deformations in a glass rod softened beforehand by passing in front of the heating blowpipes.

In these machines which by rotating the drum produce an ampoule by means of the gripper head, the formation of a constriction and bringing to a point of the ampoules is done by drawing the heated tube round a ring; consequently the diameter of the point and that of the constriction depend on the heating, that is to say the temperature reached by the glass tube. In these known machines the heating is constant for a given operation; thus, for instance, the duration of the heating preparatory to drawing is constant. But, unfortunately, the tubes used vary in thickness and diameter. This results therefore in differences in the temperatures of the heated tubes and, starting from this, in differences in behaviour during drawing which results in differences in diameters of the points and constrictions, which are the cause of subsequent difficulties and even of total loss on filling and closing. It may very well happen that filling, which is effected by inserting a needle in the orifice at the point, or tip, is not possible in that the orifice is insufficient for the passage of the needle; furthermore since that the closure is effected almost exclusively by melting the point which is subjected to a heating of given intensity and duration, it occurs that thin points bulge while thick points run the risk of not completely closing. In either case the re-entry of air into the ampoule is to be feared, which would mean that its contents would frequently become unusable.

The drawbacks due to a constant heating of the part of the rods subjected to drawing to form the point and possibly the constriction are avoided in a machine in accordance with the invention provided for the manufacture of hollow bodies and especially ampoules for medicaments.

Detailed description of the invention

The invention consists of a machine of the above kind characterized in that it comprises, for the formation of the point and possibly of the constriction of the ampoules, a duration-heating blowpipe timed and controlled by adjustable means by members, which are movable by the action of entrainment means in turn controlled by a device for grading the finished ampoules in lots, determined beforehand according to the diameter of the points, in such a way that the device for grading a finished ampoule causes the actuation of the entrainment means corresponding to the lot in which the ampoule is graded and possibly of a corresponding means of control of the inspection of the duration of heating of the said blowpipe when the tube from which the ampoule is to be drawn passes in front of the said blowpipe.

According to another feature the adjustable means of inspection of duration of the heating of the blowpipe consist of cams which are integral with sliding rods carried by a rotor rotating in synchronism with the drum carrying the grippers, the said rods sliding longitudinally parallel to the axis of rotation of the rotor.

According to another feature the movable members which act on a finger carried by the cams consist of combs brought from a rest position to a working position by entrainment means controlled by the grading device; furthermore the combs are fixed on rods sliding in fixed supports under the action of entrainment means consisting of electromagnets, and pneumatic or hydraulic cylinders.

In another feature the entrainment means which are actuated by sensing elements which sense the passage of an ampoule across a calibrating member, receives, incidentally, a staring impulse due to the rotor rods.

According to another feature the device for grading the ampoules consists of calibrating members formed by pairs of lugs spaced out to determine the diameter of the points of ampoules brought by a conveyor and it has for the purpose of sensing the passage across one or other calibrating member and the passage of the ampoule towards one lot or the other, sensing members equal in number to the number of calibrating members, the said sensing members being carried by a bar given a vertical movement alternating in either direction.

Furthermore, the cams for the inspection of the duration of heating each consist of steps of variable length so that these cams vary in size; these cams, the number of which is equal to the number of gripper heads, pass respectively in front of a circuit interrupting member acting on a means of control of the duration of the heating which causes a temporary displacement of the heating blowpipe in relation to the glass tubes; the blowpipe may be orientable or slidable transversely on its support arm or it may be fixed on a temporarily movable support arm.

The said circuit interrupting member acts during a period of time dependent on the size of the cam.

A specific embodiment of the invention will now be described by way of example with reference to the accompanying drawings, in which:

FIGURES 1A and 1B are diagrammatic part perspective views of the left hand part and right hand part respectively of a machine embodying the invention and sectioned through a vertical plane passing through the axis of the vertical drum, and FIGURE 2 is a view on a larger scale, in perspective, showing the mounting of a pivotable and orientable blowpipe.

The machine shown in FIGURES 1A and 1B will not be described in detail as regards its well known elements some of which are only referred to for making matters clear. Furthermore in order not to confuse the drawings, the electrical circuits have not been shown.

The machine has a fixed pedestal 1 carrying a fixed cylindrical cam 2 and a drum rotatable about a vertical axis and including a lower plate 3 and an upper plate 4 on the periphery of which are located lower rotating grippers 3a and upper rotating grippers 4a respectively. Each lower rotating gripper is co-axially arranged with a respective upper rotating gripper, and together they constitute gripper heads for glass rods, such as those shown at 5.

On rotation of the drum all the glass tubes pass successively in front of blowpipes placed on posts fixed round the said drum. The blowpipes having their jets directed towards the glass tubes to be heated are mounted on arms, such as 6, pivotable on rings 7b mounted on fixed columns such as 7. Followers 7a at the end of an arm 6 bear against a gripper and entrain the said arms along a portion of the circumference of the drum so that the blowpipe follows for a certain period of time the gripper whose glass tube, if it holds one, is thus for each of the operations heated during a constant period of time.

In particular a pivoting blowpipe heats each tube for a fixed period, as a preliminary to the drawing of the said tube for the formation of the point of the ampoule which involves the drawbacks explained above.

These are obviated by subjecting, in accordance with the invention, each tube to a controlled duration of heating dependent on the diameter of the point of the ampoule which was drawn from the tube during the preceding rotation of the drum.

For this purpose the ampoules drawn from the tubes are brought by a duct 8 on a conveyor 10 to the inlet of a device for grading ampoules according to the diameter of the point. This device comprises a set of calibrating members consisting of lugs 9 arranged in pairs at predetermined distances apart; the number of the calibrating members, which is five in the example, is equal to the number of lots according to which it is desired to grade all the ampoules produced. The conveyor 10 consists of two parallel bars 10a provided with slots spaced at a distance apart equal to that separating two successive calibrating members; these bars 10a are connected by a bar 11 and by a bar 12 and are subjected to a rotary motion. This motion is produced from a shaft 13 which is actuated by a shaft 13b of the ampoules machine and which entrains a pinion 13a and a chain 14 which in turn drives shafts 15 and 16. On the shafts 15 and 16 there are mounted two connecting rods (not shown) attached to the bar 12 which thus perform a circular motion.

Along the bar 10a situated beside the bottom of the ampoules to be graded are two fixed bars 17 and 18. The bar 17 supports the ampoules and the bar 18 acts as an abutment for their base.

An ampoule gripped by the conveyor 10 is deposited on the lugs 9 of a grade and on the rear support 17, and sensing members consisting of microswitches such as 19, lower and verify the presence of an ampoule. These microswitches are fixed to a support 20 fixed to a rod 21 carried by two uprights 22 sliding vertically in a fixed support 23 under the action of a follower 24 rolling on a rotary cam 25 driven by the shaft 16. These microswitches which are thus subjected to alternate movements of rise and fall are equal in number to the number of grades and consequently to the number of lots; a finished ampoule is conveyed by the conveyor from one calibrating member to another until its point succeeds in traversing a given calibrating member; then it falls into a corresponding duct (not shown) and is led towards the corresponding lot or to another machine for finishing.

When an ampoule has passed across a given calibrating member the corresponding microswitch 19 is no longer arrested during the descending movement of the support 20 and its closes an electric circuit (not shown) supplying an electromagnet such as 26 with current; to each calibrating member of the grading device there corresponds an electromagnet similar to 26; in the machine represented in the figure there are five grades and consequently five electromagnets. These electromagnets such as 26 constitute the means of entrainment of five movable members each formed by a comb 27 mounted on two parallel rods such as 28 which slide longitudinally in the fixed supports 29. In the rest position the combs 29 are located against one of the fixed supports carried by the cross-members 39 which are integral with the frame 40.

A rotor 30 rotating in synchronism with the drum formed by the lower plate 3 and upper plate 4 consists of two cheeks 31 fixed on a rotary shaft 32 passing in bearings such as 33 and entrained by the transmission chain 34 by the general drive of the machine. This rotor 30 has rods 35 placed on the periphery of the cheeks 31 parallel to the shaft 32; these rods are equal in number of the number of gripper heads on the plates 3 and 4 and slide in the cheeks 31. In these rods 35 are fixed stepped cams such as 36 varying in size according to the size of the steps; these cams are each provided with a finger 37. When the electromagnet 26 whose feed circuit has been closed by the action of the microswitch 19 corresponding to the grade in which the ampoule has passed, has received an impulse supplied by the passage of a rod 35 over a microswitch 38, then the electromagnet 26 causes the corresponding comb 27 to slide and also the corresponding cam 36 whose finger 37 is engaged between the teeth of the said comb. Any cam 36 undergoes a displacement in one direction or the other according to the last ampoule drawn from the glass tube by the corresponding gripper head has passed across the grades situated on one side or the other of the median grade which corresponds to the diameter of the mean point which is particularly desired.

By the rotation of the rotor 30, the cam 36 whose position has just been controlled passes under a follower 42 carried by a microswitch 41 carried by an arm 41a. This switch closes, during a period of time dependent on the size of the cam at this point, the electric circuit supplying current to an electromagnet 43 (FIGURE 2), which is carried on a pivoting arm 6 carried by the fixed column 7. On this pivoting arm 6 is mounted a blowpipe 44 which is orientable or rotatable round a shaft 45; this blowpipe 44 is provided with an arm 46 to which is articulated a connecting rod 47 articulated to the rod 48 attracted by the electromagnet 43 against the action of a return spring 49. When its supply circuit is closed by the passage of a cam 36 under the follower 42 of the circuit-interrupting member 41, the electromagnet 43 therefore rocks partially in the direction of the arrow Y the blowpipe 44 whose jet is no longer directed towards the glass tubes 5 until the pivoting arm 6 leaves the glass tube gripper and the duration of heating is thus decreased by a period of time corresponding to the size of the cam. When the arm 6 leaves the gripper the circuit-interrupting member 41 leaves the cam 36, the circuit of the electromagnet 43 opens and the blowpipe 44 returns to its starting position under the action of the return spring 49. Given that each cam 36 has a variable size dependent on the length of the steps, the follower 42 remains in contact with a greater or less portion of each cam according to the position imposed by the regulating combs and the heating by the blowpipe 44 is interrupted for a period of time which is greater or less for each cam and possibly variable according to the grading of the ampoule which has previously been drawn from a given glass tube.

The system which has just been described makes it possible to control the duration of heating by the blowpipe whose action precedes the formation of the point of the ampoules by drawing, and this in dependence on the diameter of the points of the ampoules which have just been obtained from the respective glass tubes; in this way the diameter of the points is corrected. With the same installation it is also possible to control the duration of heating by a blowpipe 50 used for another operation such as for instance the formation of a constriction. For this purpose it is sufficient to mount the blowpipe orientably on a pivoting arm 51 in a similar way to the blowpipe 44 and to control its orientation by an electromagnet 50a, fed by a circuit closed by a microswitch 52 which is actuated by the cam 36 which has just passed under the microswitch 41; in this way the heating is adjusted to correct the diameter of the constricted portions of the ampoules.

When the rods 35 carrying the cams 36 arrive at the end of travel on either side of the cheeks 31 of the rotor 30, they abut against one another or other of the microswitches 53 or 54 which cause the emission of impulses of current in one direction or the other of the coils 55 or 56 of a selector 57, a movable lever 58 of which is thus entrained from one side or the other of the zero point (FIGURE 1B); consequently, the selector 57 sends current in one direction or the other to a motor 60 of a servomotor 59 which acts on a speed-varying device 61 to increase or decrease the speed of rotation of the machine according to whether the cams are at the end of travel to the left or to the right of the rotor 30.

Two cams 62 and 63 are fixed on the shaft 32 of the rotor 30. A microswitch 64 actuated by the cam 63 feeds electric impulses in either direction to the motor, according to the position of the lever 58; these impulses are stopped when the selector lever 58 is at zero.

As soon as the microswitch 64 has finished sending its impulse, the microswitch 65 is actuated by the cam 62 and resets the selector 57 to zero, at each rotation of the rotor 30.

When the plates 3 and 4 of the ampoules have made a complete rotation the rotor has also made one rotation; one ampoule is finished, and is separated from the glass tube and the operations described can recommence.

The invention is not restricted to the embodiment described but with certain modifications it can be applied to a machine with dicontinuous rotation.

Furthermore, without departing from the scope of this invention, some elements of the machine which has just been described can be replaced by equivalent elements having the same functions; thus for example the electromagnets constituting the means of entrainment of the movable members, that is to say the combs, can advantageously be replaced by pneumatic or hydraulic cylinders; similarly the means of control of the duration of heating can be an electromagnet, a pneumatic cylinder or an hydraulic cylinder.

What is claim is:

1. A machine for the production of ampoules for medicaments from glass tubes comprising a fixed pedestal, a rotary drum with a vertical axis on said pedestal, rotating upper and lower grippers on said drum for holding glass tubes, blowpipes arranged at fixed stations around said rotary drum including a particular blowpipe for heating said glass tubes for the formation of the points of the ampoules, adjustable means for controlling the time of heating by said particular blowpipe, a grading device for grading the completed ampoules into lots determined according to the diameter of the point, movable member means for positioning said adjustable means, entrainment means responsive to the graded diameter of the ampoule point for positioning said movable member means, whereby said grading device causes the actuation of said entrainment means corresponding to the lot into which an ampoule is graded and the actuation of said adjustable means controlling the time of heating of said particular blowpipe when the glass tube which has given the ampoule repasses in front of the said particular blow pipe.

2. A machine as claimed in claim 1, the adjustable means for controlling the time of heating by the particular blowpipe consisting of cams integral with sliding rods carried by a rotor rotating in synchronism with the drum carrying the grippers.

3. A machine as claimed in claim 2, wherein the rods carrying the cam slide longitudinally parallel to the axis of rotation of the rotor.

4. A machine as claimed in claim 3, wherein the cams are each provided with a finger co-operating with the movable members.

5. A machine as claimed in claim 4, wherein the movable member means acting on the cams consist of combs brought from a position of rest to a working position by the means of entrainment controlled by the grading device.

6. A machine as claimed in claim 5, wherein the combs are fixed on rods sliding in fixed supports under the action of entrainment means.

7. A machine as claimed in claim 5, wherein device for grading the ampoules comprises calibrating means whose measuring lugs arranged in pairs have from one to another in each pair a distance fixed for the purpose of determining the diameter of the points of the ampoules for grading into different lots.

8. A machine as claimed in claim 7, wherein the grading device has sensing elements to sense the passage of the point across a calibrating means, to determine the lot for the ampouule.

9. A machine as claimed in claim 8, wherein the sensing element are carried by a bar given a vertical reciprocating movement.

10. A machine as claimed in claim 9, wherein the sensing elements act on circuits supplying energy to the means of entrainment of the movable members.

11. A machine as claimed in claim 10, wherein circuits supplying energy to the entrainment means are controlled by a circuit-interrupting member actuated by the rods of the rotor.

12. A machine as claimed in claim 11, wherein the cams controlling the duration of heating by the blowpipe actuate respectively at least one circuit interrupting member placed in a circuit controlling the time of heating by the blowpipe.

13. A machine as claimed in claim 12, wherein the means of control of the time of heating is an electromagnet actuated by the adjustable means of control of the time and to cause a temporary movement of the blowpipe transversely to the glass tubes.

14. A machine as claimed in claim 13, wherein the blowpipe is orientable on its support arm.

15. A machine as claimed in claim 13, wherein the blowpipe is slidable transversely on its support arm.

16. A machine as claimed in claim 13, wherein the blowpipe is fixed on a movable support arm.

17. A machine as claimed in claim 14, wherein the blowpipe is orientable on a pivoting support arm having an arm articulated to a movable rod under the action of the means of control of the time of heating against the action of a return spring.

18. A machine as claimed in claim 2, wherein the adjustable means of control of the duration of heating act according to their end positions on two microswitches placed respectively in circuits feeding two coils of a control selector of the direction of the feed current of a servomotor acting on a member varying the drive of the drum, the said current being fed starting from a microswitch actuated by a cam fixed on the shaft of the rotor.

References Cited

UNITED STATES PATENTS

| | | | |
|---|---|---|---|
| 2,355,280 | 8/1944 | Dichter | 65—158 X |
| 2,659,182 | 11/1953 | Argyle | 65—158 X |
| 2,849,114 | 8/1958 | Noble et al. | 65—158 X |
| 2,755,703 | 7/1956 | Politsch et al. | 65—158 X |
| 3,113,010 | 12/1963 | Willis et al. | 65—108 X |
| 3,265,487 | 8/1966 | Kahlenberg | 65—270 |
| 3,327,848 | 6/1967 | Barnhart et al. | 209—74 |

S. LEON BASHORE, Primary Examiner

ARTHUR D. KELLOGG, Assistant Examiner

U.S. Cl. X.R.

65—108, 162, 181, 270, 271